US009798833B2

(12) United States Patent
Biehn et al.

(10) Patent No.: US 9,798,833 B2
(45) Date of Patent: Oct. 24, 2017

(54) ACCESSING INFORMATION CONTENT IN A DATABASE PLATFORM USING METADATA

(71) Applicants: Rolf Biehn, Vancouver (CA); Brian Parker, Vancouver (CA)

(72) Inventors: Rolf Biehn, Vancouver (CA); Brian Parker, Vancouver (CA)

(73) Assignee: SAP AG, Walldorf (DE)

( * ) Notice: Subject to any disclaimer, the term of this patent is extended or adjusted under 35 U.S.C. 154(b) by 517 days.

(21) Appl. No.: 14/144,327

(22) Filed: Dec. 30, 2013

(65) Prior Publication Data
US 2015/0186553 A1    Jul. 2, 2015

(51) Int. Cl.
G06F 17/30    (2006.01)
(52) U.S. Cl.
CPC .. G06F 17/30997 (2013.01); G06F 17/30592 (2013.01)
(58) Field of Classification Search
CPC ............... G06F 17/30997; G06F 17/30592
See application file for complete search history.

(56) References Cited

U.S. PATENT DOCUMENTS

| 2008/0010268 A1* | 1/2008 | Liao .................. G06F 17/30672 |
| 2008/0082495 A1* | 4/2008 | Polo-Malouvier G06F 17/30333 |
| 2013/0173257 A1* | 7/2013 | Rose .................... G06F 17/277 704/9 |

OTHER PUBLICATIONS

"Database connection," *Wikipedia*, visited Sep. 21, 2013, 3 pages.

* cited by examiner

*Primary Examiner* — Kristopher Andersen
(74) *Attorney, Agent, or Firm* — Klarquist Sparkman, LLP

(57) ABSTRACT

Systems and methods are disclosed for accessing information content in a database environment using metadata. The method may include receiving search criteria for searching a plurality of database connections. Each of the plurality of database connections may be associated with analytics metadata. At least one of the plurality of database connections may be identified. The analytics metadata associated with the at least one of the plurality of database connections may meet the search criteria. The identified at least one of the plurality of database connections may be rated. The search criteria may include a keyword, and each of the plurality of database connections may include a database, a database query, or a data cube. The analytics metadata may include metadata associated with the database, the database query, the data cube, or an analytics report accessible using at least one of the plurality of database connections.

16 Claims, 15 Drawing Sheets

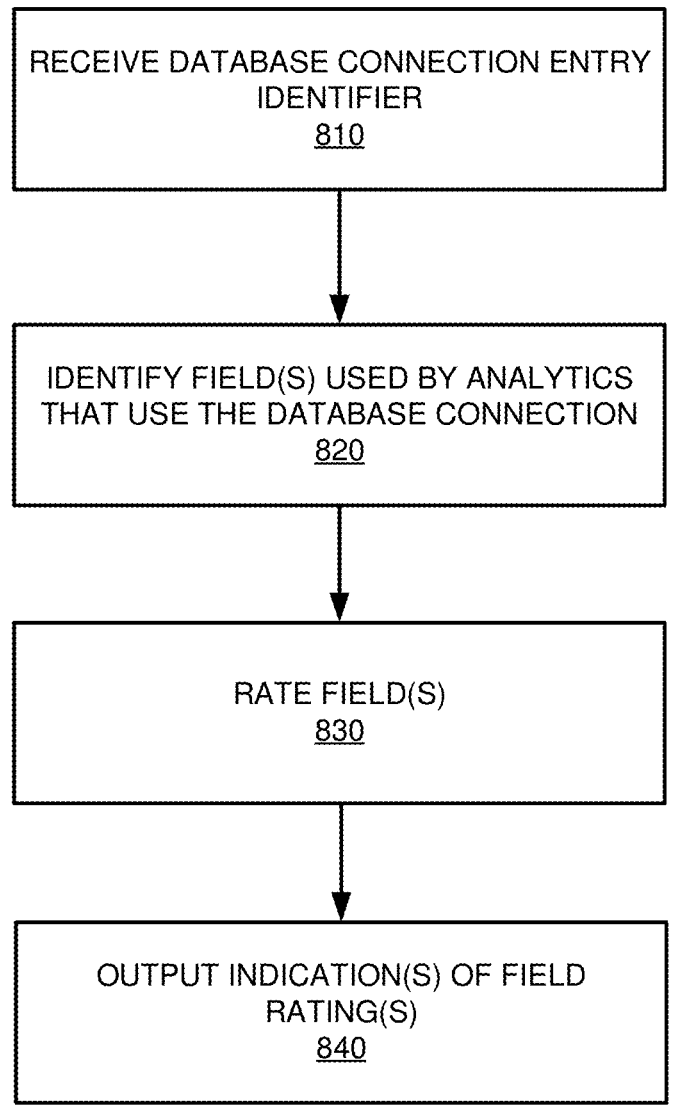
FIG. 8

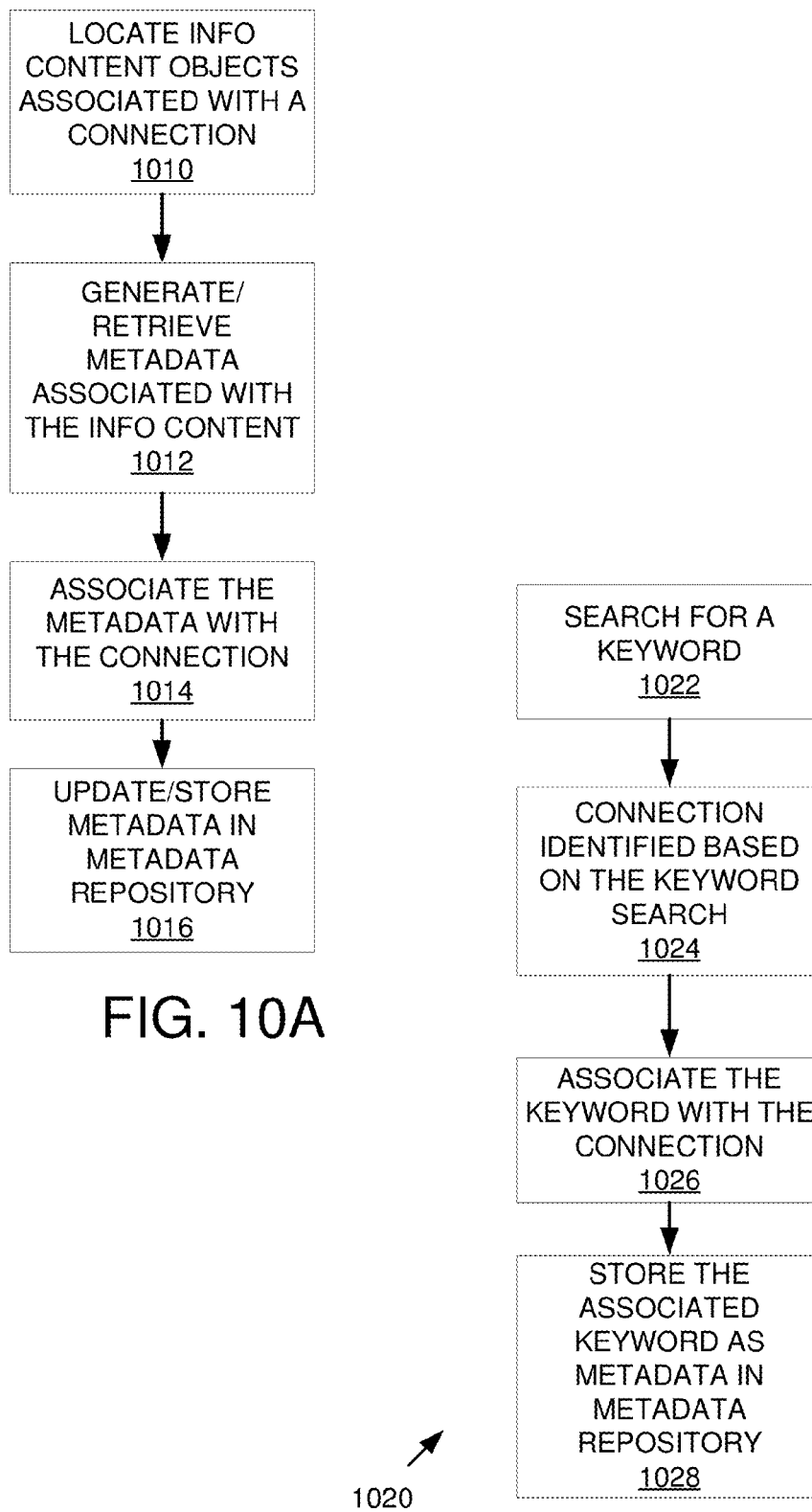

ACCESSING INFORMATION CONTENT IN A DATABASE PLATFORM USING METADATA

BACKGROUND

Creation, management and retrieval of data analytics are important aspects of database platform enterprises. For example, data analysts create and add on a daily basis, new information content to the database platform information content repository (the term "information content" is defined herein below). End-users with access to the information content repository may search for certain information content. However, current tools available to data analysts and end-users do not provide an efficient and robust mechanism for accessing the information content repository in order to add new information content, update existing information content, or review previously-prepared information content.

In many cases, it can be difficult for a data analyst to know where to begin. For example, the data analyst may need to know a specific database location in a complicated hierarchical database platform environment in order to secure write or read access for managing the information content. Similarly, an end-user may need to know the specific location within the database platform environment before an information content search may be performed. There is therefore room for improvement.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

In an example aspect of the disclosure, accessing information content in a database platform environment may be performed and may include filtering using a keyword, analytics metadata associated with one or more database connections to information content. The database connections may include a database, a database query, or a data cube. Each of the database connections may include metadata attributes, which may define at least a portion of the analytics metadata. For example, the metadata attributes may include a connection name, a column name, a field name, or a title name associated with the database, the database query, the data cube, or an analytics report accessible using at least one of the database connections. One or more of the database connections may be selected, if the keyword matches at least one of the metadata attributes, and the selected one or more database connections may be rated.

As described herein, a variety of other features and advantages can be incorporated into the technologies as desired.

BRIEF DESCRIPTION OF THE DRAWINGS

FIG. 8 is a flowchart of an exemplary method for identifying and rating fields within a database connection using analytics metadata.

FIGS. 10A-10B are flowcharts of exemplary methods for expanding the analytics metadata within the system of FIG. 1.

DETAILED DESCRIPTION

Example 1—Exemplary Overview

Figure 1:
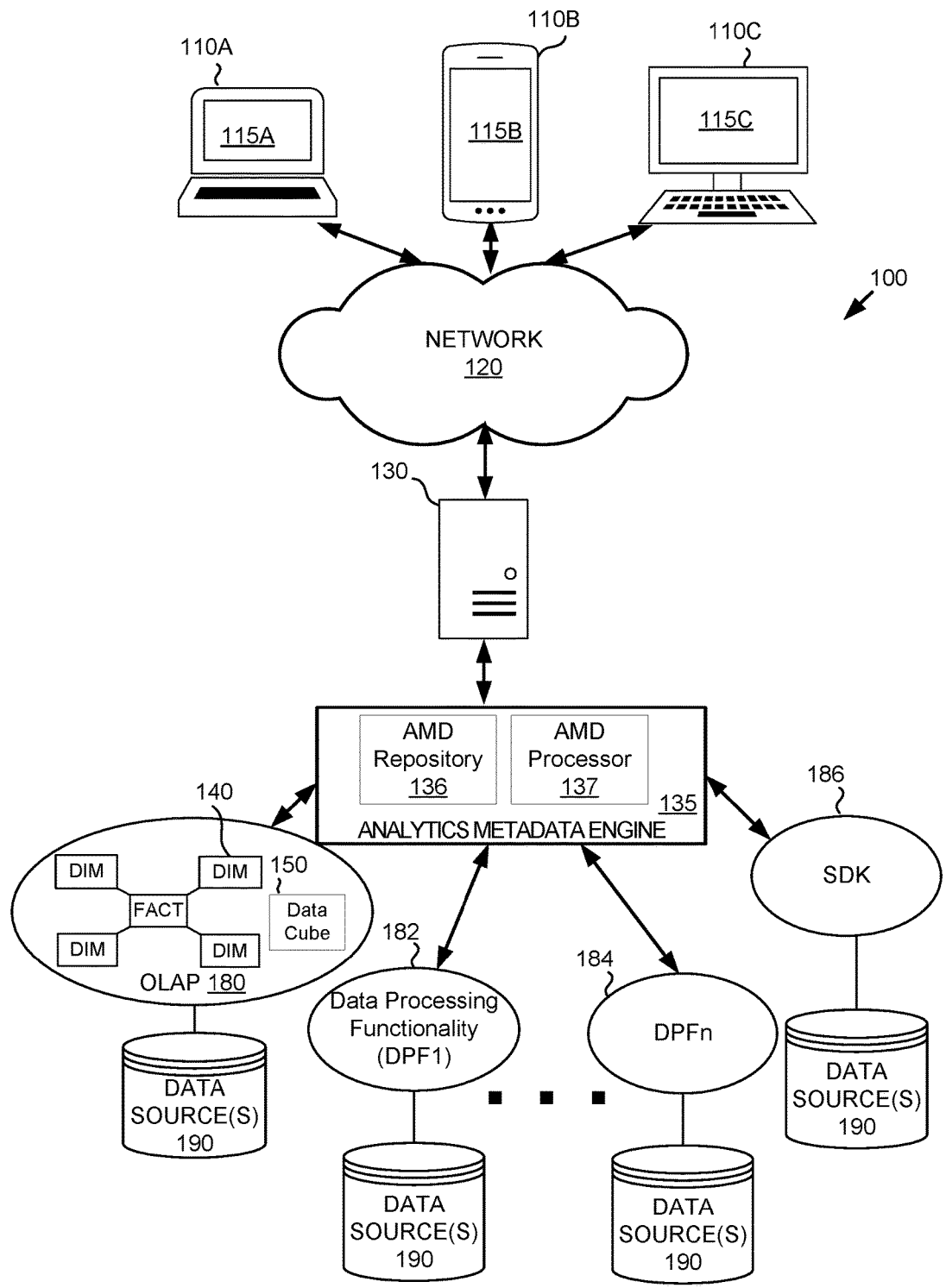
FIG. 1 is a block diagram of an exemplary system for accessing information content in a database platform using metadata.

The technologies described herein can be used for accessing information content in a database platform using metadata in a variety of scenarios. Adoption of the technologies can provide efficient access to information content in both transactional (e.g., access previously created information content) and analytical scenarios (e.g., created new information content or update existing information content) while allowing both data analysts as well as end users (e.g., customers) the flexibility to efficiently access and manage information content using analytics metadata.

As used herein, the term "information content" (or "Info-Content") can include analytics data, such as created analytics reports, analytics, or other artifacts created by enterprise database suites (e.g., SAP's Crystal Reports, Lumira Datasets, WEBI reports, XCelcius reports, etc.). The technologies can accommodate other, arbitrary information content such as spreadsheets, images, or the like.

As used herein, the term "database connection" (or simply a "connection") can include the connection established between a client device (e.g., an access terminal) and one or more database servers (i.e., database repositories) hosting at least one database. In this regard, a "database connection" may include information identifying a database (e.g., a server address and logon properties of a database), information identifying a subset of a database (e.g., fields, calculations, filters, groupings, or the like), information identifying a database query (or simply a "query"), and/or information identifying a data cube (or simply a "cube") (such identifying information may include a server address and a technical name of a cube). Each of the database connections may be associated with one or more fields, which may be used to further distinguish and/or classify the information content for a given database connection.

As used herein, the term "analytics metadata" can include metadata associated with information content, as well as metadata associated with one or more locations hosting the information content. For example, for a given analytics report, the "analytics metadata" may include metadata associated with the report itself (e.g., title, author, date of creation, report fields, report columns, linked information sources, and the like), as well as metadata associated with the database connection for the analytics report (e.g., metadata associated with a database, a database query and/or a data cube used for accessing or hosting the analytics report). Additionally, analytics metadata for one category of database connections (e.g., a database) may be associated (e.g., linked) to analytics metadata associated with another database connection category (e.g., a query and/or a cube), and/or to analytics metadata associated with information content that is accessible via the database connection.

The disclosed technologies may be used by data analysts during the creation of information content. For example, analytics metadata associated with the information content may be used to search for a database connection using a keyword, and then rank the database connections based on a match between the keyword and various categories of analytics metadata for the database connection. After the database connections are ranked and a connection is selected, a search of the fields associated with the selected database connection may be performed. The search of the fields may also be based on a match between the keyword and various categories of analytics metadata associated with the fields for the selected database connection. The fields may then be ranked and a field may be selected based on the ranking.

The disclosed technologies may also be used by end users to search for previously-created information content that is available in a repository and is accessible using the selected database connection and/or field In this document, various methods, processes and procedures are detailed. Although particular steps may be described in a certain sequence, such sequence is mainly for convenience and clarity. A particular step may be repeated more than once, may occur before or after other steps (even if those steps are otherwise described in another sequence), and may occur in parallel with other steps. A second step is required to follow a first step only when the first step must be completed before the second step is begun. Such a situation will be specifically pointed out when not clear from the context. A particular step may be omitted; a particular step is required only when its omission would materially impact another step.

In this document, the terms "and", "or" and "and/or" are used. Such terms are to be read as having the same meaning; that is, inclusively. For example, "A and B" may mean at least the following: "both A and B", "only A", "only B", "at least both A and B". As another example, "A or B" may mean at least the following: "only A", "only B", "both A and B", "at least both A and B". When an exclusive-or is intended, such will be specifically noted (e.g., "either A or B", "at most one of A and B").

In this document, various computer-implemented methods, processes and procedures are described. It is to be understood that the various actions (receiving, storing, sending, communicating, displaying, etc.) are performed by a hardware device, even if the action may be authorized, initiated or triggered by a user, or even if the hardware device is controlled by a computer program, software, firmware, etc. Further, it is to be understood that the hardware device is operating on data, even if the data may represent concepts or real-world objects, thus the explicit labeling as "data" as such is omitted. For example, when the hardware device is described as "storing a record", it is to be understood that the hardware device is storing data that represents the record.

Example 2—Exemplary System Implementing Accessing Information Content Using Analytics Metadata FIG. 1 is a block diagram of an exemplary system 100 for accessing information content in a database platform using metadata. In the example, any number of client devices 110A-C present user interfaces 115A-C, by which the devices 110A-C can interact with at least one server device 130 via a network 120 to perform the described technologies.

A server 130 can offer access to one of a plurality of data sources 190 via a metadata engine 135. For example, the server 130 can offer access to data sources 190 via the analytics metadata engine 135 and online analytical processing (OLAP) functionality 180, which can include presentation or representation of the data sources 190 as being organized according to a star schema 140, a data cube 150, or the like. In some instances, the server 130 can offer access to data sources 190 via other data processing functionalities 182, . . . , 184, which may be part of one or more enterprise-type database access/processing suites.

In other instances, the server 130 may be operable to access a data source 190 using software development kit (SDK) functionality 186 provided by a third party. For example, the SDK 186 may be used to provide a plug-in to the client devices 110A-110C so that the client devices may access information content hosted by a third party data source In practice, OLAP functionality 180 (or any of the remaining data processing functionalities 182, . . . , 184) can be invoked by activating a user interface (UI) for searching through and ranking one or more database connections and/or database fields using the analytics metadata engine and a predefined search criteria (e.g., a keyword). In this regard, an online analytical processing session may be initiated, by which the client devices 110A-C can access information content in a database platform using analytics metadata.

The analytics metadata engine 135 may comprise suitable circuitry, logic and/or code and may be used for searching information content accessible by the server 130 using analytics metadata. In this regard, the analytics metadata engine 135 may comprise analytics metadata repository 136 and analytics metadata processor 137. The analytics metadata repository 136 may be used to store analytics metadata associated with one or more database connections, database fields, and/or information content. The analytics metadata processor 137 may comprise suitable circuitry, logic, and/or code and may be used to perform functionalities associated with locating and ranking of database connections, database fields, as well as accessing information content using analytics metadata.

Even though the analytics metadata engine 135 is illustrated as a stand-alone module, the present disclosure may not be limited in this regard and the analytics metadata engine 135 (or one or more modules within the engine 135) may be part of (implemented within) the server 130, the OLAP 180, or the DPFs 182, . . . , 184.

In practice, the systems shown herein, such as system 100 can vary in complexity, with additional functionality, more complex components, and the like.

The system 100 and any of the other systems described herein can be implemented in conjunction with any of the hardware components described herein, such as the computing systems described below (e.g., processing units, memory, and the like). In any of the examples herein, the inputs, outputs, and tools can be stored in one or more computer-readable storage media or computer-readable storage devices. The technologies described herein can be generic to the specifics of operating systems or hardware and can be applied in any variety of environments to take advantage of the described features.

Client/server operation can be supported, and cloud computing techniques can be applied to give clients the ability to perform the described techniques without concern over the actual computing infrastructure needed or used to operate the servers, which can be administered by a business entity different from the client user.

Example 3—Exemplary UIs for Accessing Information Content

Figure 2A:
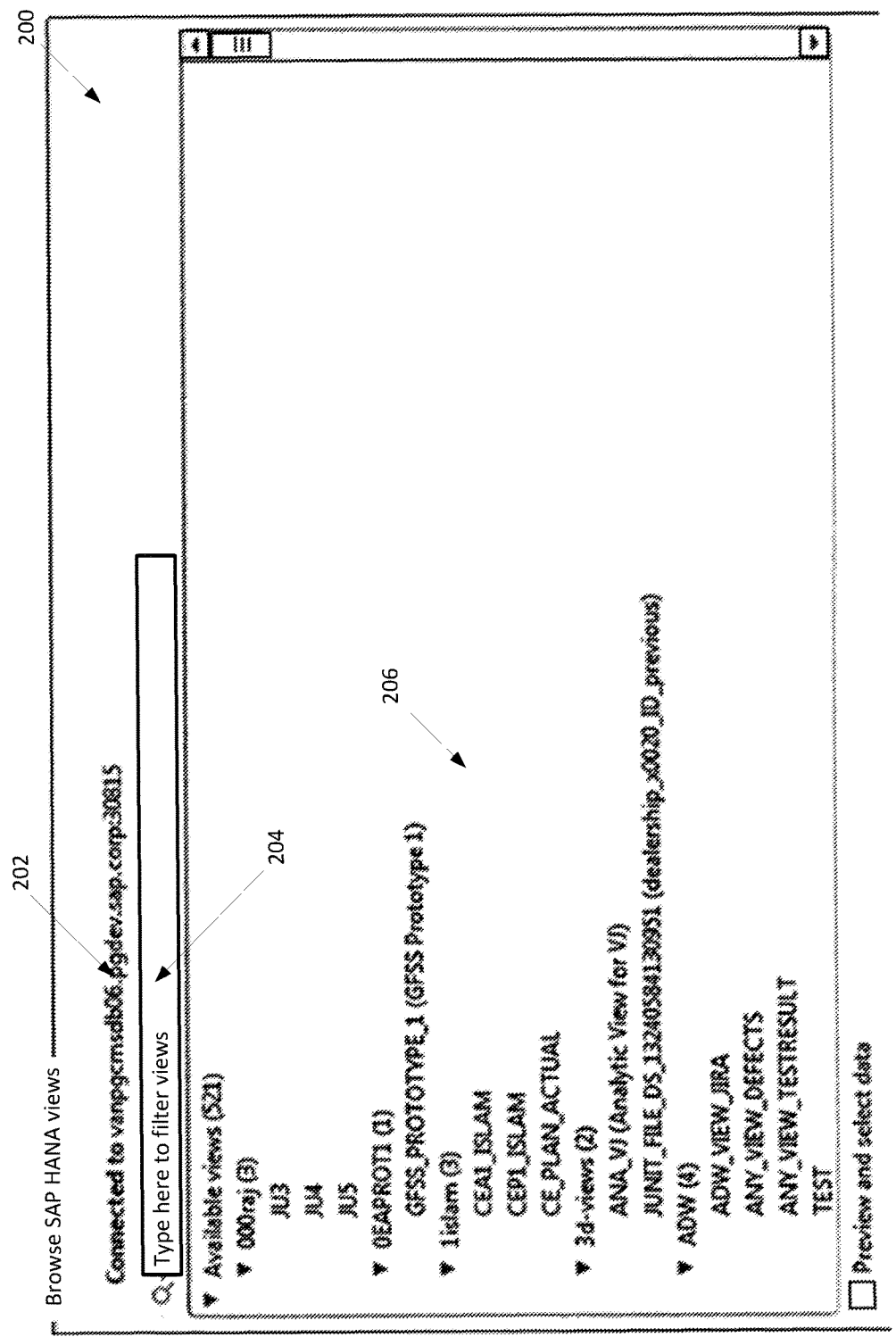
FIGS. 2A-2B are example user interfaces that can be used for accessing information content within the system of FIG. 1.
Figure 2B:
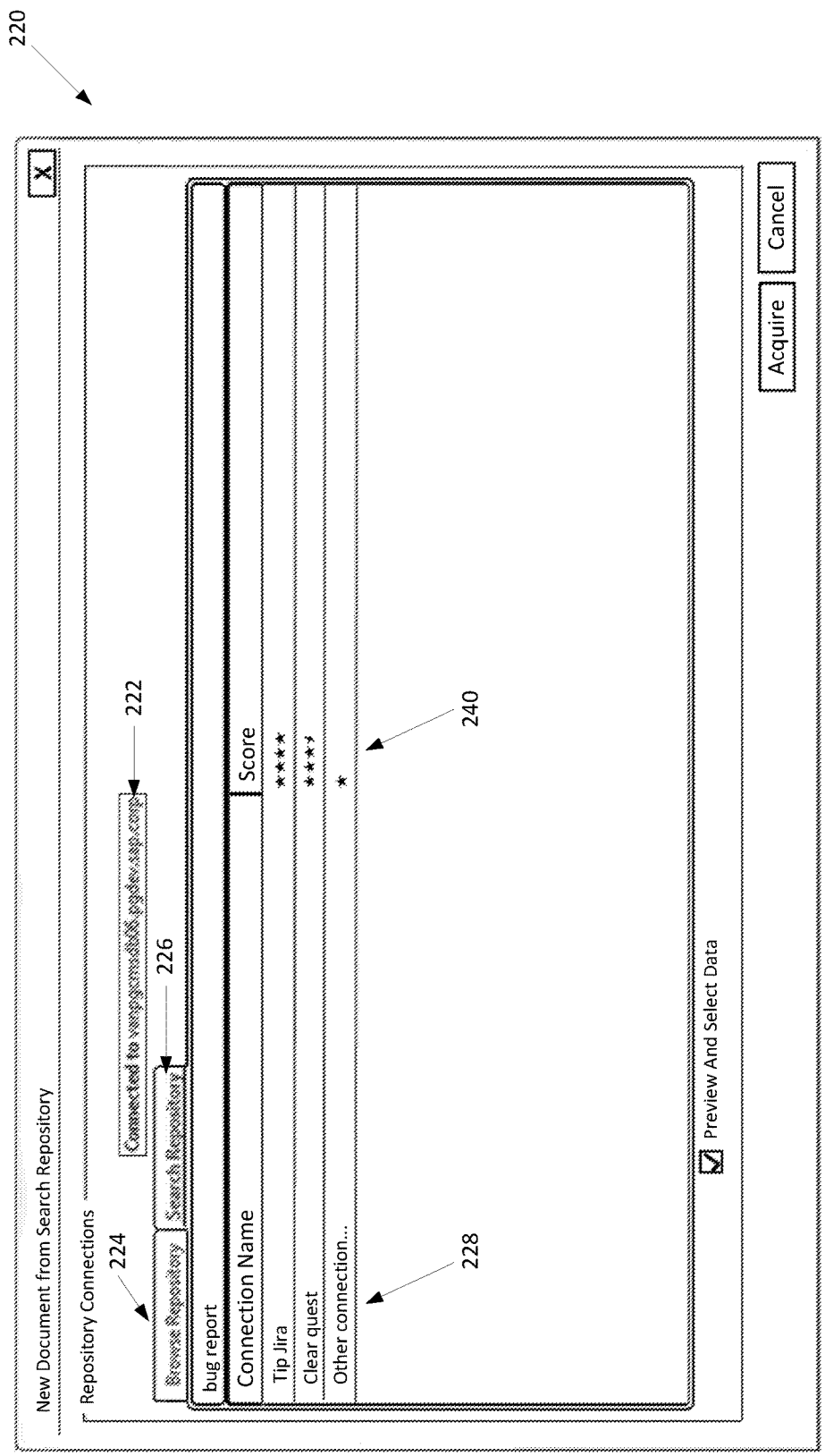

FIGS. 2A-2B are example user interfaces that can be used for accessing information content within the system of FIG. 1. Referring to FIG. 2A, there is illustrated a first UI 200, which may be used to access a database connection. The UI 200 may indicate an enterprise database environment 202 that the current client device displaying the UI 200 is connected to. The UI 200 may also indicate a hierarchical structure 206 of available database connections maintained by the enterprise database environment 202. A data analyst may use the search box 204 to enter one or more keywords or phrases to filter through the hierarchical structure 206 of available database connections in accordance with the technologies described herein. The UI 200 allows for searching for a database connection. Without the technologies described herein, such search is dependent upon the analyst knowing the hierarchical structure 206 of available database connections or the name of a specific database connection.

Referring to FIG. 2B, there is illustrated a second UI 220, which may be used to access a database connection using analytics metadata. The UI 220 may indicate an enterprise database environment 222 that the current client device displaying the UI 220 is connected to. The UI 220 may include a plurality of tabs, such as a browse tab 224 and a search tab 226. The browse tab 224 may be used to navigate through, for example, a hierarchical database connection structure (similar to the structure 206 in FIG. 2A) so that a database connection may be selected.

The search tab 226 may use functionalities described herein to search for a database connection, database field and/or information content using analytics metadata. For example, upon entry of a keyword, one or more information content repositories associated with the enterprise database environment 222 may be searched. More specifically, analytics metadata associated with database connections may be used to generate a list of database connections based on a match between the keyword and at least one analytics metadata associated with the database connections. The list of database connections may then be ranked using one or more criteria, such as relevancy, field names of query, usage data, keyword association, etc. A score 240 may be assigned to each located database connection, and the database connection list 228 may be arranged based on the score 240. After a user selects a database connection, a similar ranking based on a match between database field metadata and the keyword may be performed with regard to one or more database fields of the selected connection. Finally, after a database connection and/or one or more database fields have been selected, an information content search may be performed using the selected database connection and fields, based on a match between the keyword and one or more analytics metadata associated with the entered keyword.

Example 4—Exemplary Analytics Metadata Engine

Figure 3:
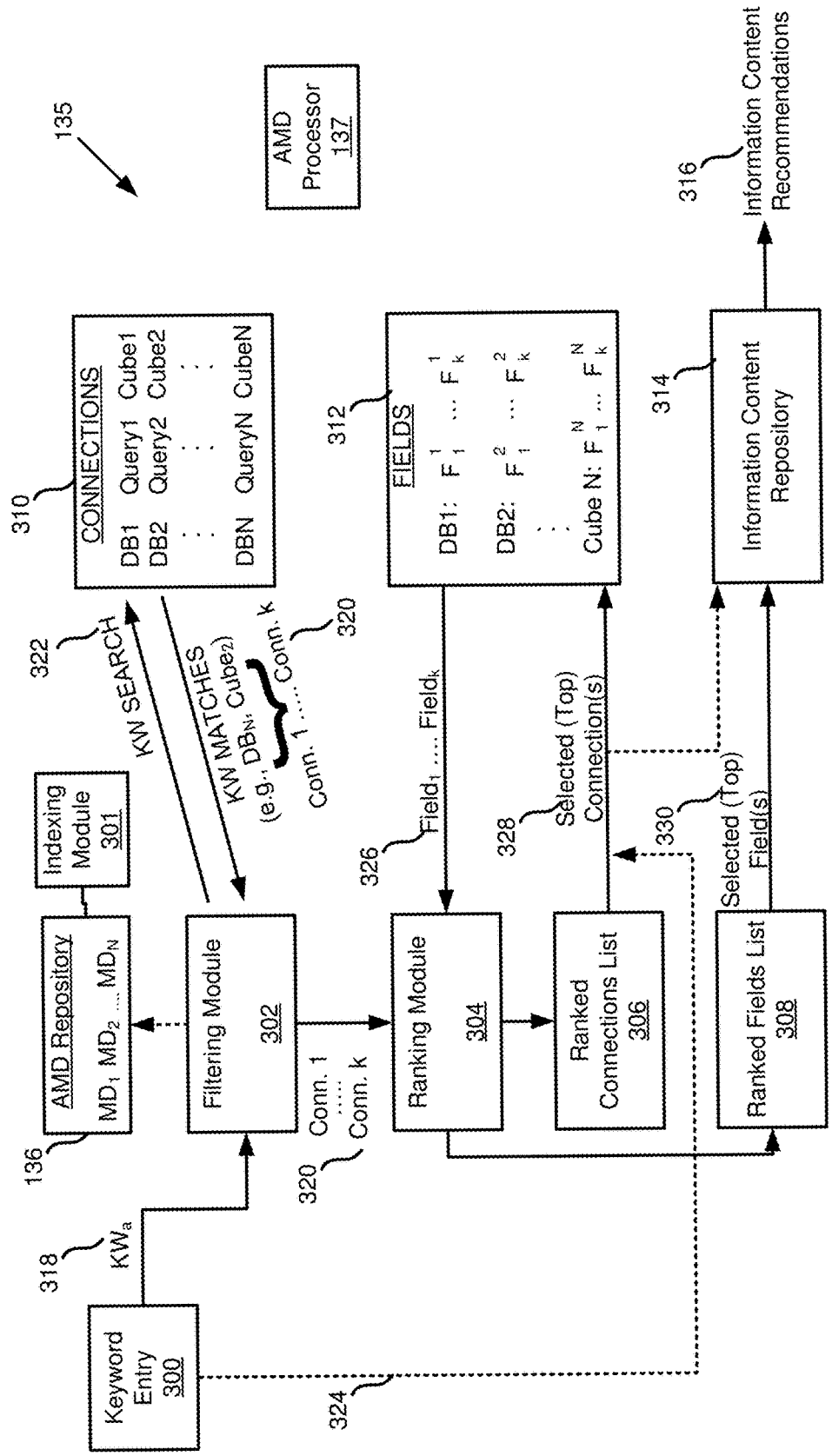
FIG. 3 is a block diagram of an exemplary analytics metadata engine for accessing information content in a database platform using metadata.

FIG. 3 is a block diagram of an exemplary analytics metadata engine for accessing information content in a database platform using metadata. Referring to FIG. 3, the analytics metadata engine 135 may comprise analytics metadata (AMD) repository 136, filtering module 302, indexing module 301, and a ranking module 304. The filtering module 302 and the ranking module 304 may be part of the analytics metadata processor 137 (illustrated in FIG. 1).

The filtering module 302 may comprise suitable circuitry, logic, and/or code and may be operable to filter one or more database connections based on a search criteria (e.g., a keyword 318) using analytics metadata from the analytics metadata (AMD) repository 136.

The ranking module 304 may comprise suitable circuitry, logic, and/or code and may be operable to rank a plurality of database connections and/or a plurality of database fields based on at least one ranking criteria and/or ranking algorithm. In some instances, the ranking module 304 and the filtering module 302 may be implemented as part of the analytics metadata processor 137 (FIG. 1).

The metadata analytics engine 135 may further include a database connections repository 310 and a database fields repository 312. The database connections repository 310 may include identifying information on databases (DB1, ..., DBN), queries (Query1, ..., QueryN), and data cubes (Cube1, ..., CubeN). The database fields repository 312 may include identifying information on the fields in each of the database connections within the database connections repository 310 (e.g., database DB1 may include k number of fields $F^1_1, \ldots, F^1_k$). Additionally, each of the database connections repository 310 and the database fields repository may include corresponding analytics metadata associated with them, where the analytics metadata may be stored in the repository 136.

The indexing module 301 may comprise suitable circuitry, logic, and/or code and may be operable to periodically scan the repositories 310, 312, 314 and extract additional metadata associated with a corresponding repository entry. For example, a scan of the information content depository may locate a report. The report may be associated with a specific connection (e.g., the database storing the report) and may have a title and a plurality of fields (e.g., text fields). Keywords then taken from the report title, the text of the fields in the report, as well as the connection associated with the report, may all be extracted and indexed as metadata associated with the report. For example, a keyword search entry with a keyword appearing in the title of the report may result in identifying the specific report as well as one or more connections associated with the report (or with other reports with that keyword in the title or any of the report fields), and/or one or more fields (appearing in the identified report or in other reports). In this regard, the indexing module 301 extracts additional metadata for items in the repositories 310-314, and it also associates each of the extracted metadata with related entries in any of the repositories 310-314.

Example 5—Operation of the Exemplary Analytics Metadata Engine

In operation, the analytics metadata engine 135 may receive a search criteria, such as a keyword 318 (KWa) via the keyword entry module 300, which may be part of the server 130 or any of the client devices 110A-110C. The filtering module 302 may initiate a keyword search 322 within the database connections repository 310. The filtering module 302 may apply, for example, a keyword filter to analytics metadata associated with the database connections stored in the database connections repository 310. A set of database connections 320 (e.g., connection1, . . . , connection k) may be selected from the database connections, if there is a match between metadata associated with the database connections (e.g., metadata MD1, . . . , MDN within AMD repository 136) and the entered keyword 318.

The filtering result (i.e., database connections 320) may then be communicated to the ranking module 304 for ranking. The ranking module 304 may be operable to rank the identified database connections 320 according to a score. In accordance with example embodiment of the disclosure, a score for ranking the identified database connections 320 may be calculated by (1) weighting a matching value for a connection name (matching value is 1 if there is connection name match, and 0 if there is not a match); (2) weighting a matching value for a column name (matching value is 1 if there is column name match, and 0 if there is not a match); (3) weighting a matching value for a keyword (matching value is 1 if there is a keyword match, and 0 if there is not a match); (4) other weighted values may also be taken into account based on the searching criteria used for a database; (5) all weighted values may then be added and divided by a sum of the weights. The following is an example equation that may be used to represent the above scoring:

$$score = \frac{w0 + connectionNameMatch + w1 * columnNameMatch + w2 * keywordMatch + \ldots}{w0 + w1 + w2 + \ldots}$$

In the above equation, Wx may be a weighting factor, which may be selected to be a constant for all values of x. In some instances, the weighting factor Wx may be variable and adjusted based on a weighting algorithm, or manually adjusted.

In the above equation, xxMatch may take the value of 1 if there is a match (and 0, if there is no match) between the keyword 318 and a corresponding analytics metadata associated with the name of a given database connection. For example, for database DB1, connectionNameMatch may equal to 1, if there is a match between the entered keyword 318 and connectionName analytics metadata for DB1 (i.e., metadata identifying the name of the database connection DB1). Similarly, columnNameMatch may take the value of 1 if there is a match (and 0, if there is no match) between the keyword 318 and analytics metadata associated with the name of a column within the given database connection. Additional xxMatch parameters may be included within the above scoring equation, with corresponding weighting values.

In accordance with an example embodiment of the disclosure, the ranking module 304 may additionally adjust the calculated scores for each of the identified database connections 320 for popularity, using the following equations:

$$adjust\_score = score * \max(popularityRank, maxPopularity),$$

where $$popularityRank = \max\left(\frac{\#countOfInfoContentWithThisConnection + smoothing}{\#countOfInfoContent + smoothing}, minRank\right)$$

The maxPopularity value may indicate a cap of popularity, and smoothing may indicate a smoothing factor. Both values may be selected based on the particular score adjustment application. In an example score adjustment application, maxPopularity may be selected as 0.3, and smoothing may be selected as 10. Other values may be selected manually by a user, or automatically using a score adjustment algorithm. For each database connection, the AMD repository 136 (and/or the information content repository 314) may return countOfInfoContentWithThisConnection as a value indicating the number of information content instances that use the currently selected database connection. The value countOfInfoContent may indicate the total number of information content instances (e.g., separate information content blocks, such as reports, etc.) stored by the information content repository 314.

The information content repository 314 may be implemented separately within the system 100, as part of any of the data sources 190, the analytics metadata engine 135 or the server 130.

After score adjustment and smoothing for each of the identified database connections 320, the ranking module 304 may rank the identified database connections 320 based on the score adjustments and/or smoothing, and generate a ranked database connections list 306. The ranked database connections list 306 may be communicated to a user of one or more of the client devices 110A-110C in a user interface (e.g., UI 220 in FIG. 2B). The user may then select at least one of the ranked database connections from the list 306 for further processing.

The selected at least one ranked database connection 328 may be used as a reference query into the database fields repository 312, and a plurality of fields 326 corresponding to the selected at least one ranked database connection 328 may be returned to the ranking module 304.

In accordance with an example embodiment of the disclosure, the ranking module 304 may be operable to rank received plurality of database fields 326 based on individual score calculated for each of the fields. More specifically, an individual score for each of the fields 326 may be calculated based on the following equation:

$$score = w0 * popularity + w1 * conditionedPopularity.$$

The popularity value may be calculated based on the following equation:

$$popularity(field) = \frac{\#count\{Match\}}{\#count\{S\}},$$

where count[S] may be the total number of information content instances in the information content repository 314, which contain the selected database connection 328. The value count[Match] may be the number of information content instances in the information content repository 314, which contain the currently selected database field.

The value of conditionedPopularity may be calculated based on the following equation:

$$conditionedPopularity = \frac{\#count\{Conditioned\}}{\#count\{S\}},$$

where count[Conditioned] may be the number of information content instances in the information content repository 314, which contain all the database fields 326.

The ranking module 304 may then generate a ranked list of database fields 308 based on the scoring assigned to the received database fields 326. The ranked database fields list 308 may be communicated to the user of one or more of the client devices 110A-110C in a user interface (e.g., UI 220 in FIG. 2B). The user may then select at least one of the ranked database fields from the list 308 for further processing. For example, one or more database fields 330 (e.g., a top ranked database field) may be selected and may be used to search the information content repository 314. More specifically, the information content repository 314 may be searched for information content instances that use the selected database field and/or have analytics metadata that matches the entered keyword 318. Any matching information content instances may be output as information content recommendations 316.

In an example embodiment of the disclosure, the search of the information content repository 314 may be based on using the selected one or more database fields 330 in addition to one or more of the following database fields: Contains fields/queries, Most viewed, Viewed recently by you, A favorite location, Date added/last modified, (search for something with "xxxxxxx" sample data string, and/or Associated meta tags.

In yet another example embodiment of the disclosure, in addition to a keyword entry 318, the analytics metadata engine 135 may also receive a selection 324 of a database connection. In this regard, a user may provide the selection 324 of a database connection in lieu of scoring and ranking the database connections 320. The database fields 326, which (in this instance) correspond to the user-selected database connection 324, may still be ranked and a ranked database fields list 308 may still be generated.

Figure 11A:
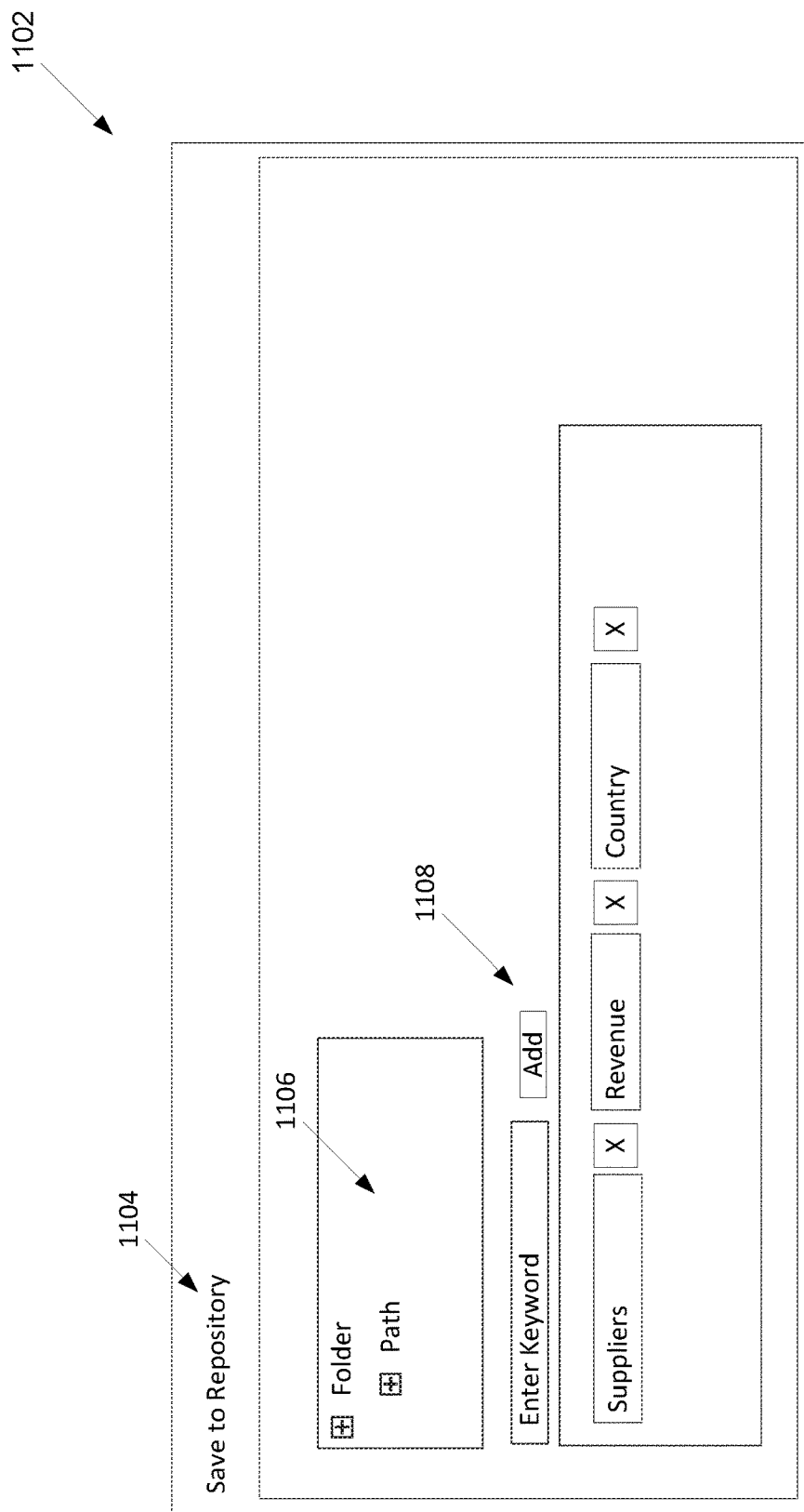
FIGS. 11A-11C are screenshots of exemplary execution of the technologies disclosed herein.

In another embodiment of the disclosure, a new report may be created. The report may include a title and a plurality of fields. The user may be given the option of specifying keywords (metadata) for the new report (as illustrated in FIG. 11A). When the report is saved, the keywords entered by the user may be stored in the AMD repository 136 as associated with the new report. Additionally, the indexing module may extract keywords from the report's title as well as from one or more of the report fields and may store the extracted information as additional metadata associated with the new report. The indexing module 301 may also extract the location (e.g., a database connection) used to store the report, and may associate metadata from the extracted connection with the new report. The indexing module may further create cross-metadata associations between all these types of metadata so that when a keyword search is performed and one type of metadata is located, it may lead to the remaining metadata as well as the content associated with it.

Example 6—Generating Analytics Metadata

Figure 4A:
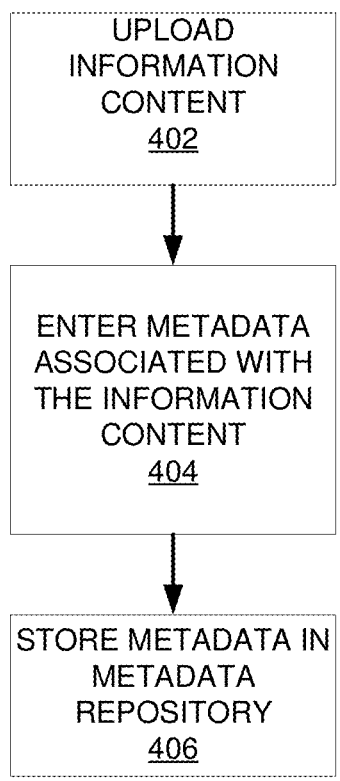
FIGS. 4A-4B are flowcharts for generating analytics metadata within the system of FIG. 1.
Figure 4B:
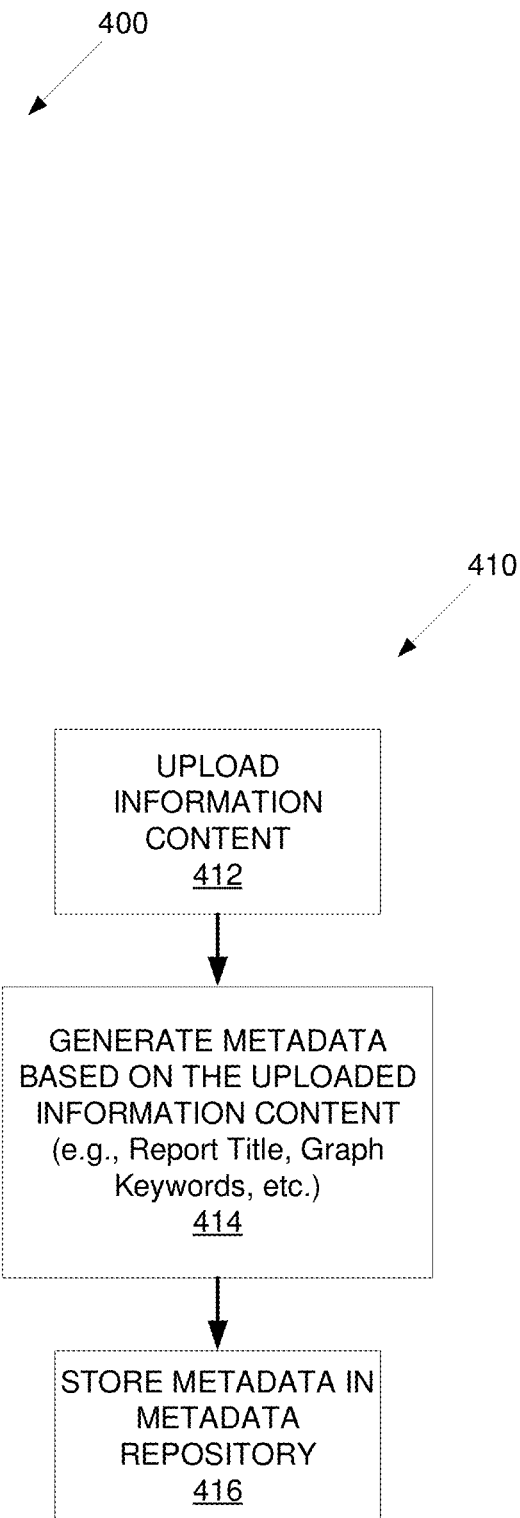

FIGS. 4A-4B are flowcharts for generating analytics metadata within the system of FIG. 1. Referring to FIGS. 1, 3 and 4A, an example method 400 for generating analytics metadata may start at 402, when information content may be uploaded to, for example, the information content repository 314. At 404, analytics metadata associated with the information content may be entered and stored (at 406) in, for example, the AMD repository 136. The analytics metadata may include metadata associated with one or more database connections (stored in the database connections repository 310), database fields (stored in the database fields repository 312), and/or information content (stored in the information content repository 314).

Referring to FIGS. 1, 3, and 4B, an example method 410 for generating analytics metadata may start at 412, when information content may be uploaded to, for example, the information content repository 314. At 414, analytics metadata may be generated based on the uploaded information content. For example, the analytics metadata may include a report title, graph keywords, date of report creation, report author, date/time of last edit, as well as other metadata associated with the uploaded information content. Such generation of the analytics metadata may be performed automatically (e.g., by scanning keywords or existing native metadata saved as part of the information content) or manually at the time the information content is uploaded. At 416, the uploaded information content may be stored in a metadata repository (e.g., 136).

Example 7—Exemplary System for Identifying and Rating Database Connections

Figure 5:
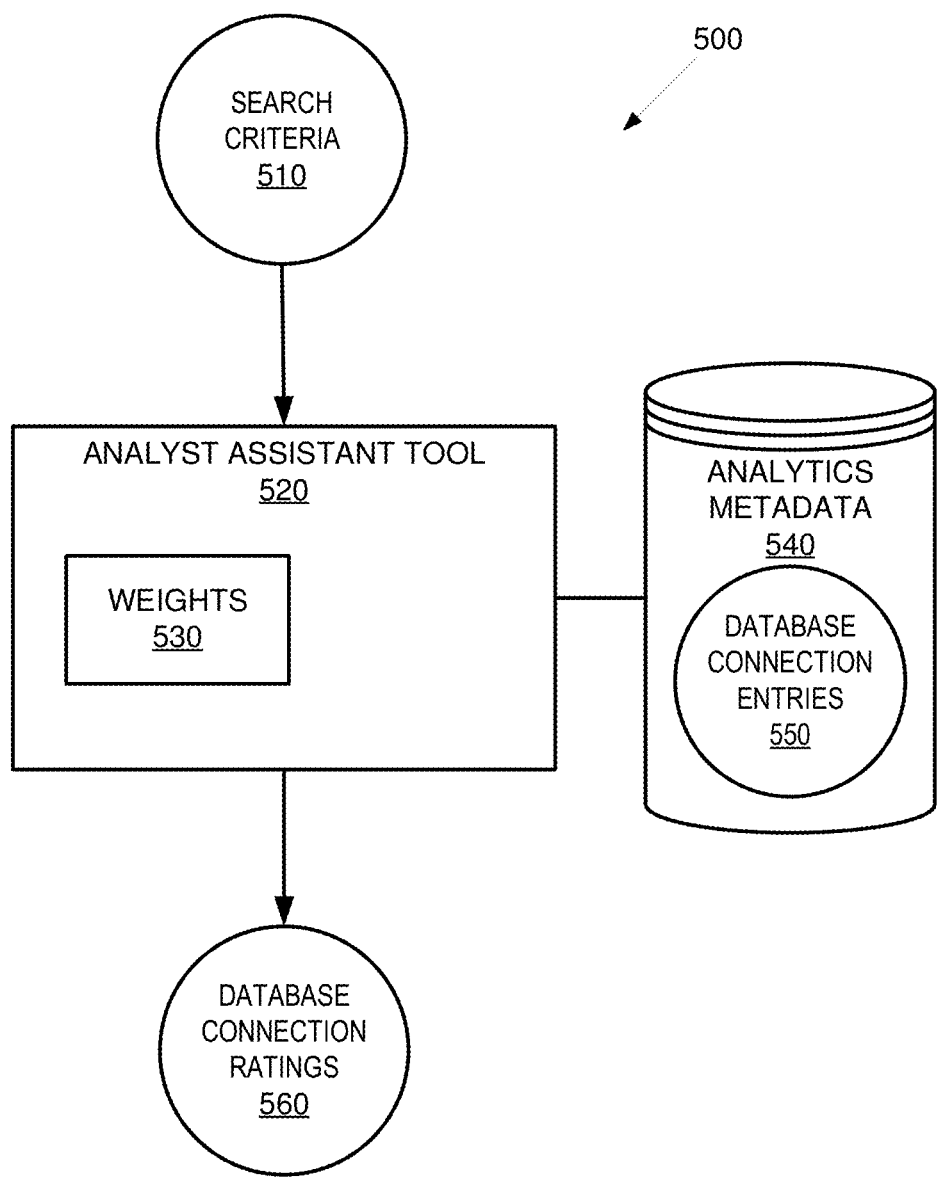
FIG. 5 is a block diagram of an exemplary system for identifying and rating database connections using analytics metadata.

FIG. 5 is a block diagram of an exemplary system for identifying and rating database connections using analytics metadata. Referring to FIGS. 1, 3, and 5, the exemplary system 500 may comprise an analyst assistant tool 520 and analytics metadata repository 540. The analyst assistant tool 520 may comprise suitable circuitry, logic, and/or code and may be operable to convert a plurality of unrated database connection entries to rated database connection entries based on a search criteria 510. More specifically, the analyst assistant tool 520 may combine the functionalities of the filtering module 302 and the ranking module 304 illustrated in FIG. 3.

In this regard, the analyst assistant tool 520 may further comprise a weights generation block 530. The weights generation block 530 may comprise suitable circuitry, logic, and/or code and may be operable to provide one or more weight values ($w_x$) used in the ranking of database connections (e.g., as described above in reference to FIG. 3). The weight values may be, for example, stored in one or more look-up tables (LUTs), may be pre-assigned, generated on the fly, and/or generated according to a weighting algorithm.

The analytics metadata repository 540 may be the same as the analytics metadata repository 136 (FIGS. 1 and 3) and may be used to store analytics metadata associated with one or more database connections, database fields, and/or information content. In some instances, the analytics metadata repository may also comprise database connections repository 550. The database connections repository 550 may be the same as the database connections repository 310 (FIG. 3) and may include identifying information on databases (DB1, . . . , DBN), queries (Query1, . . . , QueryN), data cubes (Cube1, . . . , CubeN) and/or other types of database connections. Even though the database connections repository 550 is illustrated as implemented within the analytics metadata repository 540, the disclosure may not be limited and a stand-alone implementation of the abase connections repository 550 may also be possible.

Figure 6:
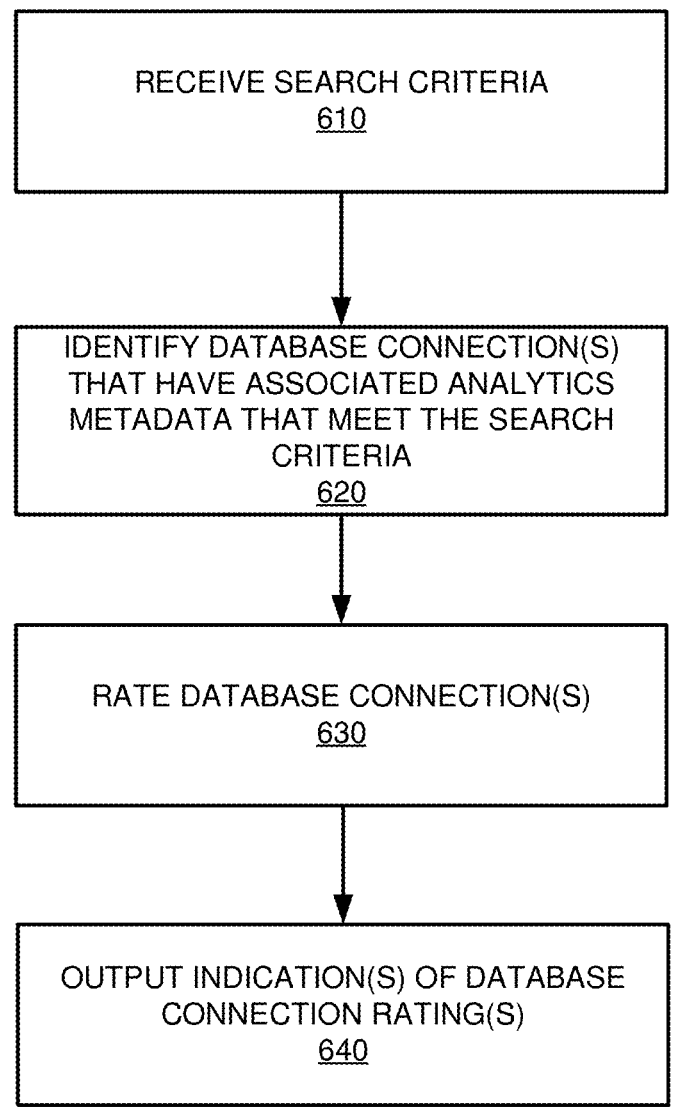
FIG. 6 is a flowchart of an exemplary method for identifying and rating database connections using analytics metadata.

Example 8—Exemplary Method for Identifying and Rating Database Connections Using Analytics Metadata FIG. 6 is a flowchart of an exemplary method for identifying and rating database connections using analytics metadata. Referring to FIGS. 1, 3, and 5-6, the exemplary method 600 may start at 610, when search criteria 510 may be received by the analyst assistant tool 520. For example, the search criteria 510 may include a keyword, such as the keyword 318 received via the keyword entry module 300 (FIG. 3). At 620, the analyst assistant tool 520 may be used to identify one or more database connections (e.g., 320) that have associated analytics metadata meeting the search criteria 510. For example, the identified database connections 320 have associated analytics metadata that matches the received keyword 318.

At 630, the analyst assistant tool 520 may rate the identified database connections. For example, the analyst assistant tool 520 may assign a score to each of the identified database connections using one or more of the weights 530. The scoring (rating) process for scoring (rating) database connections identified based on a search criteria (e.g., a keyword match) is described herein above in reference to FIG. 3.

At 640, the analyst assistant tool 520 may output an indication 560 of the scored (rated) database connections. More specifically, a database connections list 306 may be generated, which may indicate the score (or rating) of each of the identified database connections. Additionally, the database connections list 306 may rank the identified database connections based on their rating (e.g., the list 306 may be a list of the top-rated database connections).

Example 9—Exemplary System for Identifying and Rating Database Fields

Figure 7:
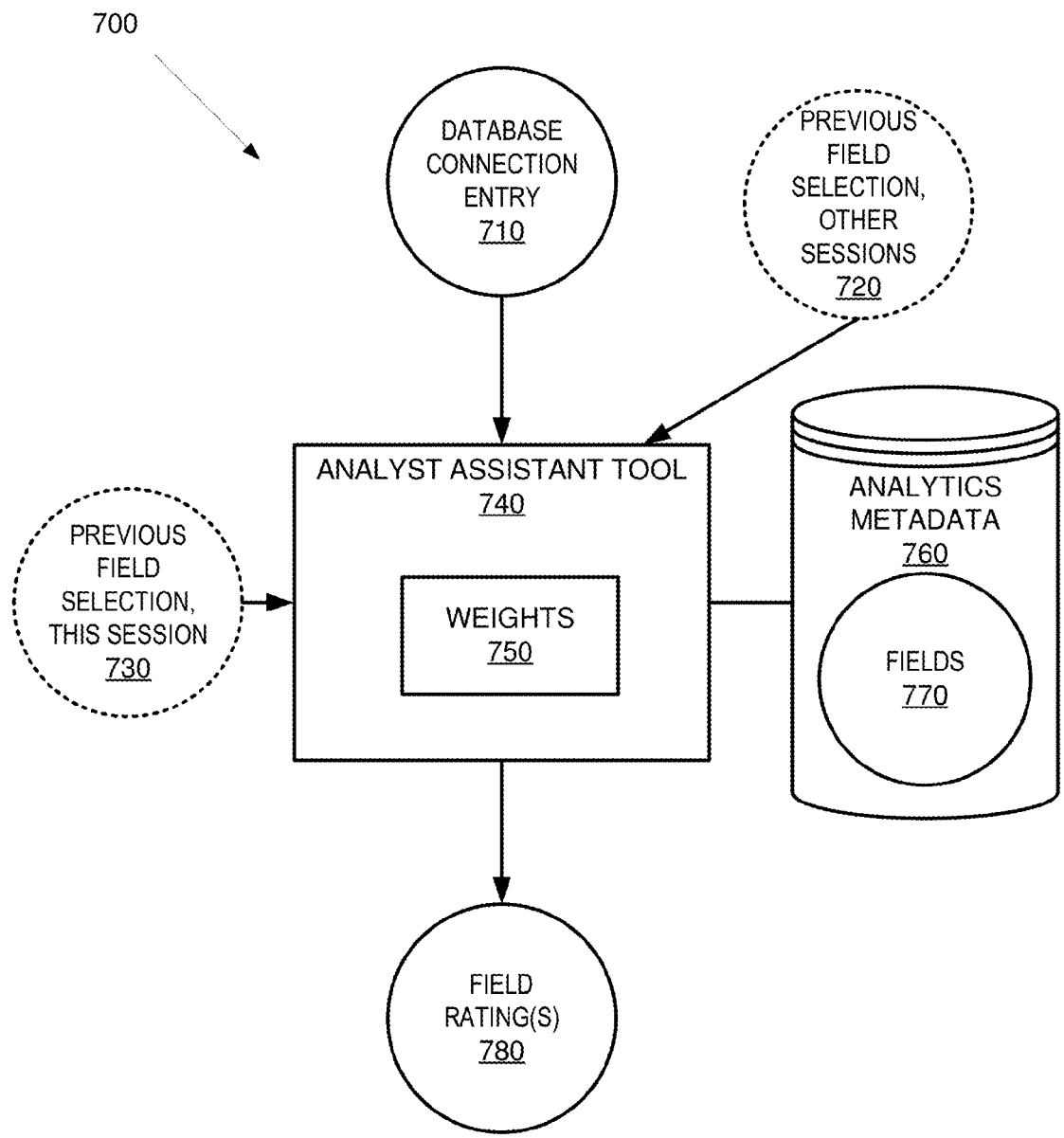
FIG. 7 is a block diagram of an exemplary system for identifying and rating fields within a database connection using analytics metadata.

FIG. 7 is a block diagram of an exemplary system for identifying and rating fields within a database connection using analytics metadata. Referring to FIGS. 1, 3, and 7, the exemplary system 700 may comprise an analyst assistant tool 740 and analytics metadata repository 760. The analyst assistant tool 740 may comprise suitable circuitry, logic, and/or code and may be operable to convert a plurality of unrated database field entries to rated database field entries for an identified database connection entry (e.g., 710). More specifically, the analyst assistant tool 740 may combine the functionalities of the filtering module 302 and the ranking module 304 illustrated in FIG. 3, in order to score (or rate) a plurality of database fields for one or more selected database connections.

In this regard, the analyst assistant tool 740 may further comprise a weights generation block 750. The weights generation block 750 may comprise suitable circuitry, logic, and/or code and may be operable to provide one or more weight values ($w_x$) used in the ranking of database fields (e.g., as described above in reference to FIG. 3). The weight values may be, for example, stored in one or more look-up tables (LUTs), may be pre-assigned, generated on the fly, and/or generated according to a weighting algorithm.

The analytics metadata repository 760 may be the same as the analytics metadata repository 136 (FIGS. 1 and 3), and may be used to store analytics metadata associated with one or more database connections, database fields, and/or information content. In some instances, the analytics metadata repository may also comprise database fields repository 770. The database fields repository 770 may be the same as the database fields repository 312 (FIG. 3), and may include identifying information on databases fields associated with a given database connection. Even though the database fields repository 770 is illustrated as implemented within the analytics metadata repository 760, the disclosure may not be limited and a stand-alone implementation of the abase fields repository 770 may also be possible.

In accordance with an example embodiment of the disclosure, the analyst assistant tool 740 may also utilize historic fields selection data in order to score (or rate) database fields and generate the database field ratings 780 for a currently selected database connection. For example, the analyst assistant tool 740 may use a previous database field selection (e.g., 730) for a current session and/or a previous database field selection (e.g., 720) for other (e.g., previous) sessions.

Example 10—Exemplary Method for Identifying and Rating Database Fields Using Analytics Metadata FIG. 8 is a flowchart of an exemplary method for identifying and rating fields within a database connection using analytics metadata. Referring to FIGS. 1, 3, and 7-8, the exemplary method 800 may start at 810, when a database connection entry 710 may be received. For example, the database connection entry 710 (or 328 in FIG. 3) may identify a database connection selected from a ranked database connections list (e.g., 306).

At 820, the analyst assistant tool 740 may be used to identify one or more database fields (e.g., 326) that are associated with the received database connection entry 710. In some instances, the database fields may be selected based on whether associated analytics metadata for the database fields matches a search criteria (e.g., keyword 318). For example, the identified database fields 326 have associated analytics metadata that matches the received keyword 318.

At 830, the analyst assistant tool 740 may rate the identified database fields. For example, the analyst assistant tool 740 may assign a score to each of the identified database fields using one or more of the weights 750. The scoring (rating) process for scoring (rating) database fields identified based on a search criteria (e.g., a keyword match) is described herein above in reference to FIG. 3.

At 840, the analyst assistant tool 740 may output an indication 840 of the scored (rated) database fields. More specifically, a database fields list 308 may be generated, which may indicate the score (or rating) of each of the identified database fields. Additionally, the database fields list 308 may rank the identified database fields based on their rating (e.g., the list 308 may be a list of the top-rated database fields), and the list may be presented (e.g., displayed by client devices 110A-110C) so that a rating (e.g., numerical, star rating or other type rating) is displayed next to the corresponding database.

Example 11—Exemplary Types of Analytics Metadata

Figure 9:
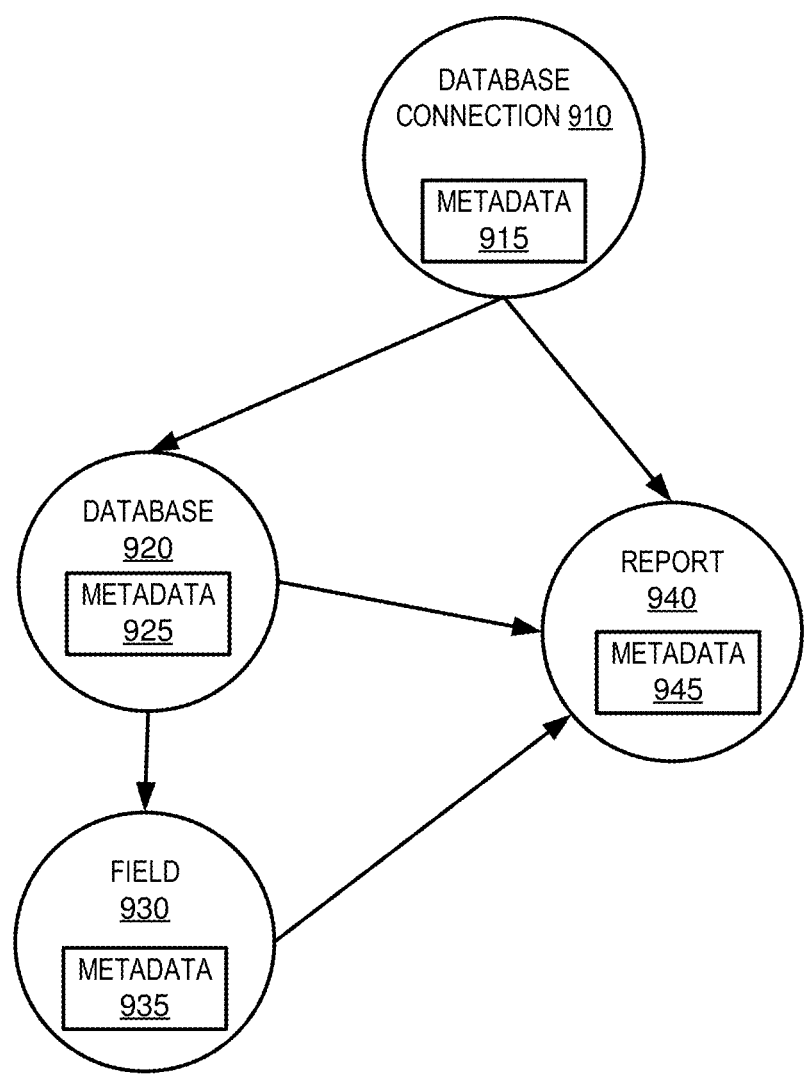
FIG. 9 is a block diagram illustrating various types of analytics metadata, which may be used for accessing information content in a database platform.

FIG. 9 is a block diagram 900 illustrating various types of analytics metadata, which may be used for accessing information content in a database platform. Referring to FIG. 9, each database connection 910 may be associated with analytics metadata 915. As explained, a database connection 910 may comprise a variety of data objects, such as a database (e.g., 920), a query and/or a data cube. Each database (e.g., 920) may include its own plurality of database objects, such as database fields (e.g., database field 930). Additionally, each database and/or field may be associated with information content (e.g., report 940).

Since a database connection 910 may be related to a database 920, at least one database field 930 and/or information content 940, similar hierarchical connection may exist between the corresponding analytics metadata 915, 925, 935 and 945. For example, analytics metadata 915 for the database connection 910 may identify the database 920, the database field 930 and/or the information content 940 as associated with the database connection 910. Similarly, each of the metadata 915, 925, 935 and/or 945 may identify one or more of the database connection 910, the database 920, one or more database fields within the database 920 (such as the database field 930) and/or the information content 940, as associated with each other. Furthermore, metadata 925 for the database 920 may be associated with one or more reports (e.g., report 940 with metadata 925) and/or one or more fields within a given report (e.g., field 930 with metadata 935). In this regard, if one of the metadata 915, 925, 935 or 945 is updated (e.g., 945 is updated due to creation of a new report 940), then the remaining analytics metadata may also be updated based on the existence of relationships between the represented objects (e.g., analytics metadata for the database connection, the database and the database field associated with the new report are all updated with metadata identifying the newly created report). Therefore, expansion (updating) of various categories of analytics metadata (e.g., analytics metadata 915, 925, and 935 for a database connection, a database, and a database field, respectively) is possible if a related category of other analytics metadata (e.g., analytics metadata 945 for information content 940) is updated.

Example 12—Exemplary Methods for Expanding Analytics Metadata

FIGS. 10A-10B are flowcharts of exemplary methods for expanding the analytics metadata within the system of FIG. 1. Referring to FIGS. 9 and 10A, the exemplary method 1000 may start at 1010 when information content objects associated with a database connection may be located. For example, once a database connection (e.g., 910) is determined (or selected), a search for information content within the connection may be performed (e.g., using a keyword, report name, etc.) and the report 940 may be located. At 1012, analytics metadata (e.g., 945) associated with the report 940 may be retrieved. At 1014, the analytics metadata 945 may be associated with the database connection 910. Additionally, the analytics metadata 915 of the database connection 910 may be updated (and become associated) with the analytics metadata 945. At 1016, the updated analytics metadata 945 (and/or 915) may be stored in the analytics metadata repository (e.g., 136 in FIG. 1).

Referring to FIGS. 3, 9 and 10B, the exemplary method 1020 may start at 1022, when a search for a keyword (e.g., 318) may be performed within the database connection repository (e.g., 310). At 1024, one or more database connections (e.g., 320) may be identified based on the keyword search. At 1026, the keyword (e.g., 318) may be associated with the identified database connections (e.g., 320). At 1028, the associated keyword may be stored in the analytics metadata repository (e.g., 136) as metadata.

Example 13—Exemplary Advantages of the Technologies

The technologies described herein may assist with creation, updating, location and retrieval of information content in an enterprise database platform. For example, information content may be created more efficiently by quickly locating a relevant database connection (and then a database field within the database connection) based on analytics metadata search and comparison. By using the analytics metadata search and comparison techniques described herein, the scope of the database connection search may be increased and a relevant database connection may be located without the need of prior knowledge of the hierarchical structure of the database connections used within the enterprise database platform.

Additionally, since popularity calculations and weighting techniques may be used in ranking the database connections and the database fields, popularity of one or more database connections and/or fields in the database platform may be leveraged for more efficient ranking and to further facilitate the selection of a database connection and database fields.

By using analytics metadata associated with various metadata attributes of the information content, the scope of search of database connections, database fields and/or information content may be substantially increased.

Example 14—Exemplary Execution

Figure 11B:
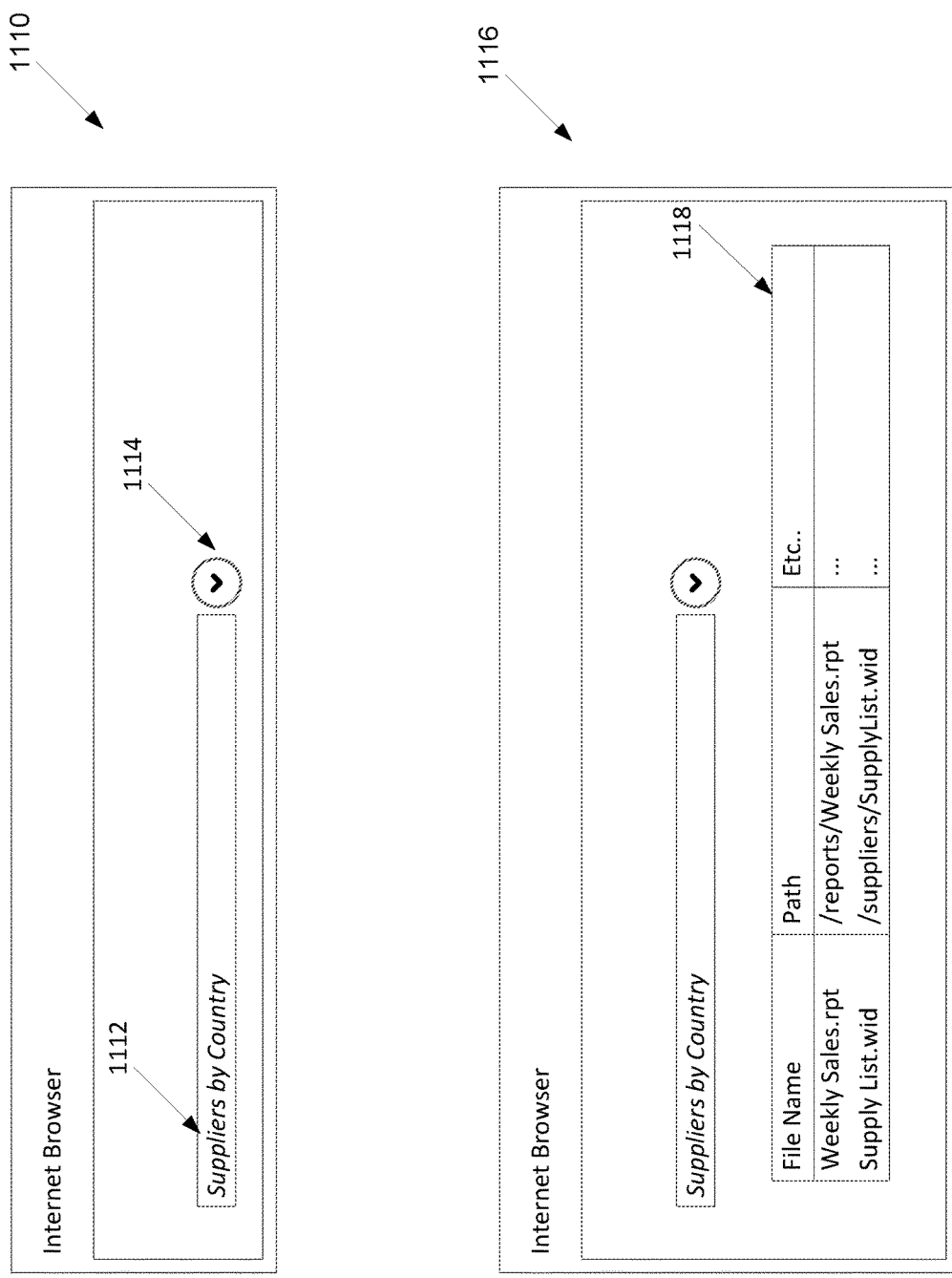
Figure 11C:
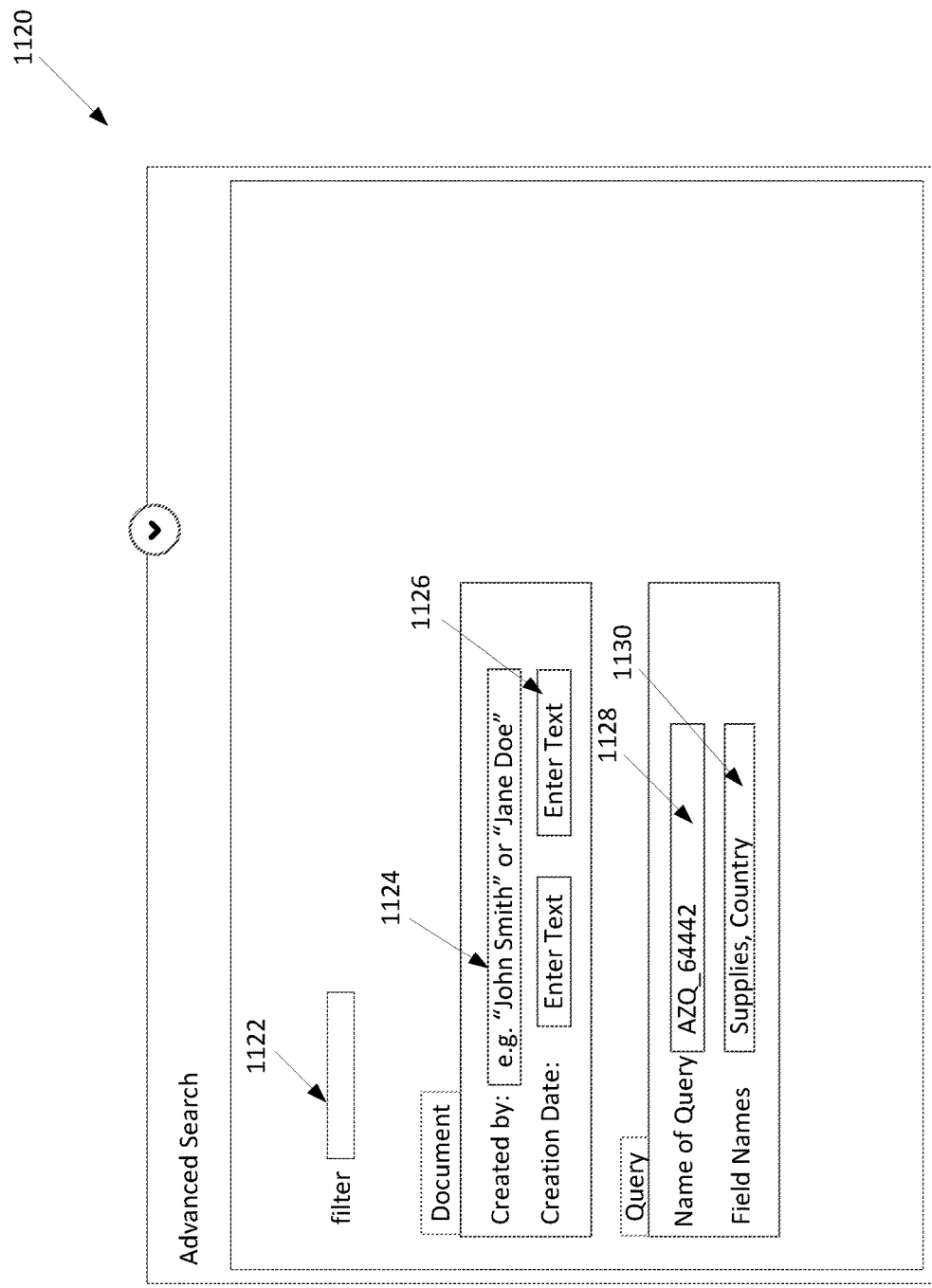

FIGS. 11A-11C are screenshots of exemplary execution of the technologies disclosed herein. Referring to FIG. 11A and screenshot 1102, after a user has created information content (e.g., a report with one or more fields), the user may elect to save the information content to a repository (at 1104). The user may also be given the option to identify the location that the created information content may be saved by, e.g., specifying or identifying a database (specifying folder and database path at 1106). The user may also be able to add keywords (at 1108), which may then be stored as metadata in the AMD repository 136. In addition to keywords specified/entered by the user, the metadata engine 135 (e.g., the indexing module 301) may also periodically scan the repositories 310, 312, 314 and extract additional metadata associated with a corresponding repository entry, as explained above in reference to FIG. 3 and the indexing module 301.

Referring to FIG. 11B and screenshot 1110, the user may enter a keyword (at 1112) for performing a search of the information content repository 314. Screenshot 1116 illustrates an example search result list 1118 in response to the keyword query entered at 1112. In some instances, the user may initiate an advanced search by selecting the indicator 1114 and as illustrated in FIG. 11C.

FIG. 11C illustrates a screenshot 1120 of an example advanced search, which may be initiated at 1114 (FIG. 11B). Initially, after the advanced search is initiated (at 1114), a list of various filters may be displayed, such as "Document" and "Query", as seen in FIG. 11C (other filters may be used as well). Each of the displayed filters may be associated with one or more of the repositories 310-314 or other types of data. For example, in addition to the "Document" and "Query" filters, there may be filters for "Connection" and "Fields". In instances when the user is specifically looking for a document related to one of the filter categories (e.g., a specific document or a query), the user may enter keywords at the corresponding entry box of the filter (e.g., 1124 and 1126 for the Document filter; or 1128 and 1130 for the Query filter). The metadata engine may then use the entered keyword for the specific filter to perform the advanced search, extracting only information content corresponding to the filter.

Example 15—Exemplary Computing Systems

Figure 12:
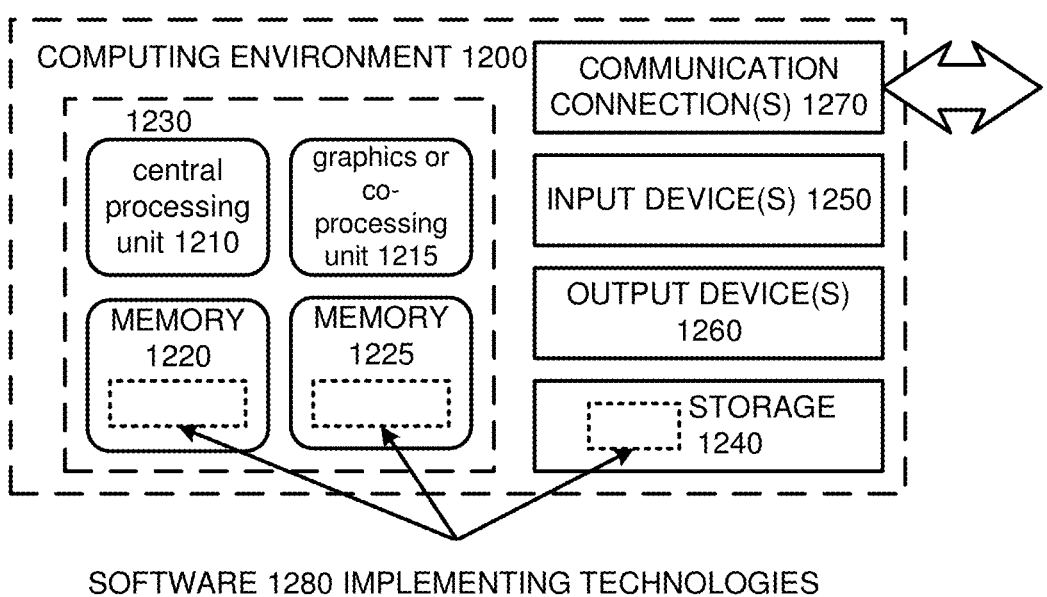
FIG. 12 is a diagram of an exemplary computing system, in which described embodiments can be implemented.

FIG. 12 is a diagram of an exemplary computing system, in which described embodiments can be implemented. The computing system 1200 is not intended to suggest any limitation as to scope of use or functionality, as the innovations may be implemented in diverse general-purpose or special-purpose computing systems.

With reference to FIG. 12, the computing system 1200 includes one or more processing units 1210, 1215 and memory 1220, 1225. In FIG. 12, this basic configuration 1230 is included within a dashed line. The processing units 1210, 1215 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), nonvolatile memory (e.g., ROM, EEPROM, flash memory, etc.), or some combination of the two, accessible by the processing unit(s). The memory 1220, 1225 stores software 1280 implementing one or more innovations described herein, in the form of computer-executable instructions suitable for execution by the processing unit(s).

A computing system may have additional features. For example, the computing system 1200 includes storage 1240, one or more input devices 1250, one or more output devices 1260, and one or more communication connections 1270. An interconnection mechanism (not shown) such as a bus, controller, or network interconnects the components of the computing system 1200. Typically, operating system software (not shown) provides an operating environment for other software executing in the computing system 1200, and coordinates activities of the components of the computing system 1200.

The tangible storage 1240 may be removable or non-removable, and includes magnetic disks, magnetic tapes or cassettes, CD-ROMs, DVDs, or any other medium which can be used to store information in a non-transitory way and which can be accessed within the computing system 1200. The storage 1240 stores instructions for the software 1280 implementing one or more innovations described herein.

The input device(s) 1250 may be a touch input device such as a keyboard, mouse, pen, or trackball, a voice input device, a scanning device, or another device that provides input to the computing system 1200. For video encoding, the input device(s) 1250 may be a camera, video card, TV tuner card, or similar device that accepts video input in analog or digital form, or a CD-ROM or CD-RW that reads video samples into the computing system 1200. The output device(s) 1260 may be a display, printer, speaker, CD-writer, or another device that provides output from the computing system 1200.

The communication connection(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 16—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage devices, optical storage devices, or the like). Such instructions can cause a computing device to perform the method. The technologies described herein can be implemented in a variety of programming languages.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

We claim:

1. A method implemented by one or more computing devices, the method comprising:
by the one or more computing devices:
receiving one or more search criteria for searching a plurality of database connections to at least one analytics information content repository, wherein the plurality of database connections are associated with respective analytics metadata stored in a metadata repository;
identifying at least one of the plurality of database connections, wherein the identifying comprises identifying analytics metadata stored in the metadata repository that are associated with the at least one of the plurality of database connections and that meet the search criteria;
rating the at least one of the plurality of database connections;
displaying identifiers for the at least one of the plurality of database connections with corresponding ratings via a user interface;
receiving a selection of one of the plurality of database connections from the at least one of the plurality of database connections via the user interface;
responsive to the selection of the selected one of the plurality of database connections, assigning a score to at least one of a plurality of database connection fields within the selected one of the plurality of database connections, wherein assigning the score comprises determining a ratio between a number of information content instances in the analytics information content repository that contain the selected one of the plurality of database connections and a number of the information content instances in the analytics information content repository that contain the at least one of the plurality of database connection fields;
ranking the at least one of the plurality of database connection fields based on the score;
outputting an indication of the ranking of the at least one of the plurality of database connection fields via the user interface;
receiving a selection of one of the ranked plurality of database connection fields;
locating at least one analytics report with the selected one of the plurality of database connections, wherein the at least one analytics report is associated with the selected one of the ranked plurality of database connection fields and matches the search criteria; and
outputting the at least one analytics report via the user interface.

2. The method according to claim 1, wherein:
the search criteria comprises a keyword; and
at least one of the plurality of database connections comprises a database, a database query, or a data cube.

3. The method according to claim 2, wherein the analytics metadata comprises metadata associated with one or more of the database, the database query, the data cube, or an analytics report accessible using at least one of the plurality of database connections.

4. The method according to claim 2, wherein identifying the at least one of the plurality of database connections comprises:
matching the keyword with analytics metadata for a plurality of databases associated with the at least one of the plurality of database connections; and
if a match occurs, selecting the at least one of the plurality of database connections for rating.

5. The method according to claim 4, wherein the analytics metadata for the plurality of databases comprises one or more of a database name, a database column name, a database field name, and metadata associated with an analytics report stored within one of the plurality of databases.

6. The method according to claim 4, wherein the rating comprises:
assigning a score to each of the plurality of databases associated with the at least one of the plurality of database connections, based on the matching.

7. The method according to claim 6, comprising:
ranking at least a portion of the plurality of databases based on the assigned score; and
outputting an indication of the ranking of the at least a portion of the plurality of databases.

8. The method according to claim 1, wherein assigning the score to at least one of the plurality of database connection fields further comprises:
determining a second ratio between the number of information content instances in the analytics information content repository that contain the selected database connection and a number of the information content instances in the analytics information content repository that contain all of the plurality of database connection fields.

9. The method according to claim 8, wherein assigning the score to at least one of the plurality of database connection fields further comprises:
modifying the ratio using a first corresponding weighting value;
modifying the second ratio using a second corresponding weighting value; and
combining the modified ratio with the second modified ratio to generate a score for the database connection field.

10. A computing system comprising:
memory, and
one or more processors;
wherein the memory stores computer-executable instructions that are executed by the one or more processors to execute:
a metadata analytics engine, the metadata analytics engine comprising:
a database connection repository;
a metadata repository of analytics metadata associated with a plurality of database connections stored in the database connection repository;
a filtering module configured to:
filter, using a keyword, the analytics metadata stored in the metadata repository and associated with the plurality of database connections to at least one analytics information content repository, wherein each of the plurality of database connections comprises metadata attributes defining at least a portion of the analytics metadata, and
select one or more of the plurality of database connections as search results, if the keyword matches at least one of the metadata attributes associated with the plurality of database connections; and
a ranking module configured to:
rate the selected one or more of the plurality of database connections,
rank the selected one or more of the plurality of database connections based on the rating, display identifiers for the selected one or more of the plurality of database connections with corresponding ratings via a user interface; and for a database connection with a highest rating of the selected one or more of the plurality of database connections:
assign scores to a plurality of fields associated with the database connection with the highest rating, wherein assigning scores comprises determining a ratio between a number of information content instances in the analytics information content repository associated with the database connection with the highest rating and a number of the information content instances in the analytics information content repository associated with at least one of the plurality of fields;
select one of the plurality of fields based on the scores;
locate at least one analytics report with the database connection with the highest rating, wherein the at least one analytics report is associated with the selected one of the plurality of fields; and
output, via a user interface, the at least one analytics report.

11. The system according to claim 10, wherein:
each of the plurality of database connections comprises a database, a database query, or a data cube.

12. The system according to claim 11, wherein:
the metadata attributes comprise one or more of a connection name, a column name, a field name, or a title name associated with one or more of the database, the database query, the data cube, or an analytics report accessible using at least one of the plurality of database connections.

13. The system according to claim 10, wherein rating the selected one or more of the plurality of database connections comprises:
assigning a score to each of the selected one or more of the plurality of database connections based on a match between the keyword and at least one of the metadata attributes for each of the selected one or more of the plurality of database connections.

14. The system according to claim 13, wherein:
ranking the selected one or more of the plurality of database connections based on the rating comprises ranking based on the scores; and
the database connection with the highest rating comprises a database connection of the selected one or more of the plurality of database connections with a highest score.

15. One or more non-transitory computer-readable storage devices comprising computer-executable instructions for performing a method in a database platform, the method comprising:
receive search criteria for searching a plurality of database connections to at least one analytics information content repository, each of the plurality of database connections comprising a database, a database query, or a data cube within the database platform;
assign first scores to the plurality of database connections, based on matching the search criteria with analytics metadata associated with the plurality of database connections;
rate the plurality of database connections based on the first scores;
display the plurality of the database connections with corresponding scores, of the first scores, and corresponding ratings via a user interface;
receive a selection of one of the plurality of database connections via the user interface;
responsive to receiving the selection of the selected one of the plurality of database connections, assign second scores to a plurality of database fields within the selected one of the plurality of database connections, based on matching the search criteria with analytics metadata associated with the plurality of database fields, wherein assigning the second scores comprises determining a ratio between a number of information content instances in the analytics information content repository that contain the selected one of the plurality of database connections and a number of the information content instances in the analytics information content repository that contain at least one of the plurality of database fields;
select one of the plurality of database fields, based on the second scores;
identify at least one analytics report from the at least one analytics information content repository, the at least one analytics report associated with the selected one of the plurality of database connections and the selected one of the plurality of database fields; and
display the at least one analytics report via the user interface.

16. The one or more non-transitory computer-readable storage devices of claim 15, wherein the method further comprises:
rating at least a portion of the plurality of database fields based on the second score; and
outputting an indication of the rated database fields.

* * * * *